Feb. 25, 1964 W. J. PRUNER 3,121,900
INTEGRAL WINDSHIELD WIPER WASHER
Filed Sept. 13, 1962 2 Sheets-Sheet 1

WILLIAM J. PRUNER
INVENTOR

BY John R. Faulkner
Keith L. Berschling

ATTORNEYS

Feb. 25, 1964   W. J. PRUNER   3,121,900
INTEGRAL WINDSHIELD WIPER WASHER
Filed Sept. 13, 1962   2 Sheets-Sheet 2

WILLIAM J. PRUNER
INVENTOR

BY
ATTORNEY

United States Patent Office 3,121,900
Patented Feb. 25, 1964

3,121,900
INTEGRAL WINDSHIELD WIPER WASHER
William J. Pruner, Ann Arbor, Mich., assignor to Ford Motor Company, Dearborn, Mich., a corporation of Delaware
Filed Sept. 13, 1962, Ser. No. 223,434
11 Claims. (Cl. 15—250.02)

This invention relates to a windshield wiper and washer system. More particularly, this invention relates to a windshield wiper and washer system such as the type disclosed in U.S. Patent No. 3,011,199 issued on December 5, 1961.

The invention includes an actuating mechanism which is controlled by the movement of the windshield wiper drive mechanism. The invention is preferably employed with an electric windshield wiper mechanism. The windshield wiper drive mechanism periodically operates the actuating mechanism which in turn causes a washer pump to force fluid through a pair of nozzles that spray the washer solution over the surface of the windshield.

In the design of an automotive vehicle accessory, it is important that its operation does not unduly burden the driver. The operator of the vehicle should be freed from routine and distracting control tasks so that he may pay strict attention to the guidance of the vehicle and the existing road conditions. The invention provides an inexpensive and relatively simple means for semiautomatically controlling the washing of a windshield which requires little operator attention. Once the washer is actuated by the manipulation of a manual switch control, it will spray a fixed number of squirts per windshield wiper traverse until the operator disengages the washer. Automatic engagement and disengagement of the washer is possible, but not practical as the varying conditions which such a system would be required to respond to and the additional hardware necessary for control under such conditions would make the cost prohibitive. There have been quite a few prior art systems directed to a washer which when engaged sprays a fixed total number of squirts and will then be automatically disengaged. This type of system has the disadvantage that the fixed total number of squirts must be sufficient to clean the windshield under the most adverse conditions or else it would be necessary for the operator to engage the washer a number of times. It is apparent that such a system would waste washer solution if a large total number of squirts were chosen or would involve excessive operator control if too few total squirts were chosen.

The instant invention is a sound compromise which provides minimum operator control, an economic utilization of the washer solution and maximum system simplicity. Other specific structural advantages, such as, synchronization of windshield blade and washer operation, a minimum number of valves, compactness, a self-priming pump and a design which is protected from damage because of freezing, will be completely appreciated when the detailed written description is considered in conjunction with the drawings wherein.

Figure 2:
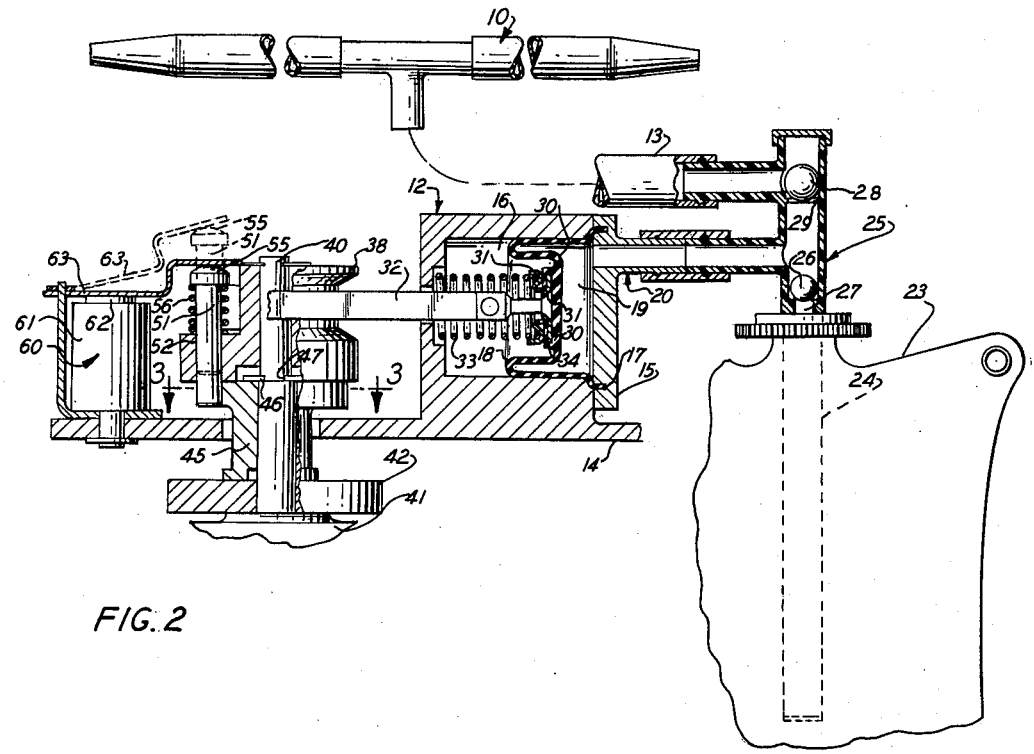
FIGURE 2 is a sectional view taken along the lines 2—2 in FIGURE 1.
Figure 1:
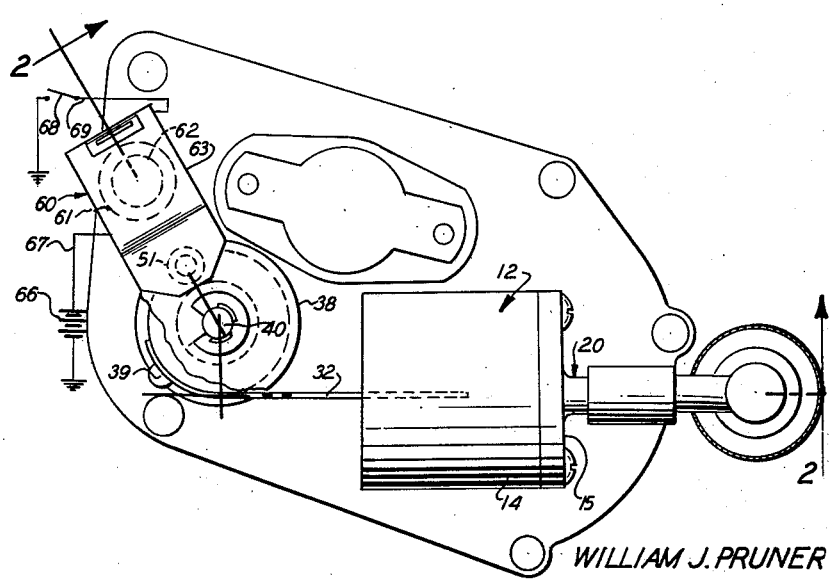
FIGURE 1 is a top view of the washer pump assembly and spray nozzle.
Figure 3:
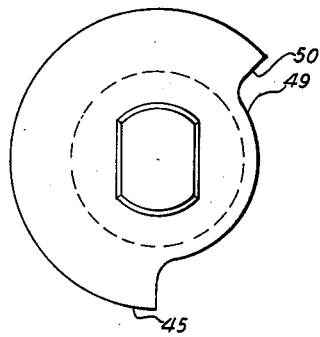
FIGURE 3 is a sectional view taken along the lines 3—3 in FIGURE 2.

In the embodiment of the invention shown in FIGURES 1, 2, and 3, the windshield wiper and washer system includes spray nozzles 10 which are located adjacent the windshield (not shown) of the automotive vehicle. The spray nozzles 10 are connected to the washer pump 12 by the conduit 13. The washer pump 12 has a housing 14 with a plate 15 fixed to the housing to form a hollow internal portion 16. The plate 15 has a circular groove 17 for receiving a flexible diaphragm 18 which is fixedly held in place by being positioned between the housing 14 and the plate 15. The flexible diaphragm 18 cooperates with the plate 15 and the housing 14 to form a fluid chamber 19. The fluid chamber 19 communicates with the spray nozzles 10 via a connection 20 which forms a part of the plate 15 and the conduit 13. The fluid chamber also communicates with the reservoir 23 which supplies washer solution to the fluid chamber 19 by way of the conduit 24 and the check valve 25. The check valve 25 has a valve ball 26 which is seated in the aperture 27 during the pumping portion of the pump cycle. The valve ball 26 allows washer solution to flow from the reservoir 23 to the field chamber 19 during the suction portion of the pump cycle and prevents the flow of washer solution from the fluid chamber 19 to the reservoir 23 during the pumping portion of the pump cycle. The valve ball 28 of check valve 25 is seated in the aperture 29 during the suction portion of the pump cycle thereby preventing air from flowing through the nozzles 10 during the suction portion of the pump cycle.

The reservoir 23 may be located so that fluid is supplied to the fluid chamber 19 by way of a gravity feed while fluid is supplied to the spray nozzle by the pumping action of the pump 20, or the reservoir may be located in the usual manner so that fluid is supplied to the fluid chamber 19 by the suction action of the diaphragm 18.

The diaphragm 18 has a stiffening portion 30 fixed to the plunger head member 31 of the flexible band or plunger member 32 by a flexible flange portion 34 which surrounds the disc member 31. A spring 33 surrounds the flexible band 32 and is interposed between the disc member 31 and the housing 14. The spring 33 aids in returning the flexible diaphragm 18 to its collapsed shape after it has been extended by the movement of the flexible band 32 to the left. The flexible band 32 is fixed to the driven hub or member 38 by a pin 39 (FIGURE 1). The driven member 38 is adapted to rotate independently on the shaft 40. The shaft 40 is mounted to rotate in support 41 and has a gear 42 fixed to it which is connected to the drive mechanism (not shown) for the windshield wiper blades. The drive mechanism rotates the shaft 40 in an oscillatory manner. A driving member 45 is also keyed to the shaft 40 and is located axially by the snap ring 46 which engages the groove 47 on the shaft 40. The driving member 45 has a recessed surface 49 that forms an abutment 50 (FIGURE 3). The abutment 50 cooperates with the pin 51 which extends through an aperture 52 in the driven member 38, to rotate the driven member 38 when the driving member 45 is rotating in a clockwise direction. The pin 51 is adapted to slide in the aperture 52 from an inoperative position to an operative position. The inoperative position is shown by the dashed lines. The pin 51 has a head 55 and a spring 56 interposed between the head 55 and driven member 38 to urge the pin 51 to an inoperative position.

The pin 51 is moved from an inoperative position to an operative position by the actuating means 60 which takes the form of a solenoid 61 having a pivotally mounted armature 63 that abuts the pin head 55. The armature 63 is of a suitable width to insure that the pin 51 is in contact with it throughout its angle of travel. In the preferred embodiment, the drive mechanism moves in an oscillatory manner. For this reason, the armature 63 is a relatively narrow member. The solenoid 61 is connected to the power source 66 via the conductor 67 and is con-

3 nected to the control switch 68 by the conductor 69. Closure of the control switch 68 will cause the armature 63 to move in a downward direction causing the pin 51 to move from an inoperative to an operative position.

In operation, assuming that the windshield wiper is running, the switch 68 is operated causing the solenoid 61 to be energized. The energization of the solenoid 61 causes the armature 63 to move in a downward direction which in turn results in the pin 51 sliding downward against the force of the spring 56 and into the path of movement of the driving member 45. The driving member 45 is continually oscillated by the drive mechanism of the windshield wiper which is connected to the gear 42. With the pin 51 extending into the path of movement of the driving member 45, the abutment 50 will be able to contact the pin 51 and drive the driven member 38 in a clockwise direction. When the driving member 45 reverses its direction and moves in a counterclockwise direction, it will move free of the driven member 38 and the pin 51. The rotation of the driven member 38 in a clockwise direction by the driving member 45 causes flexible band 32 to be wrapped around the driven member 38, thereby compressing the spring 33, moving the diaphragm 30 to the left and expanding the fluid chamber 19. The expanding of the fluid chamber 19 causes fluid to be sucked from the reservoir 23 through the check valve 25 and into the fluid chamber 19. When the driving member 45 reverses its direction and moves in a counterclockwise direction, the compressed spring 33 cooperating with the diaphragm 18 will exert a force upon the flexible band 32 causing the driven member 38 to be rotated in a counterclockwise direction at a somewhat slower rate than the driving member 45. The force exerted by the spring 33 will also cause the diaphragm 18 to move to the right from its expanded position to the collapsed position. The diaphragm 18, in moving from its expanded position to a collapsed position, will pump fluid from the fluid chamber 19 through the conduit 13 to the spray nozzles 10 which in turn distributes the washer solution over the windshield of the automative vehicle.

The above cycle will continue so long as the switch 68 is closed and the electric windshield wiper is operating. When switch 68 is opened, the solenoid 61 will be deenergized and the spring 56 will urge the pin 51 in an upward direction and out of the path of the driving member 45. This will result in the driving member 45 rotating independently of the driven member 38. The driven member 38 will, therefore, remain inoperative and the pump 12 will cease to operate.

Figure 4:
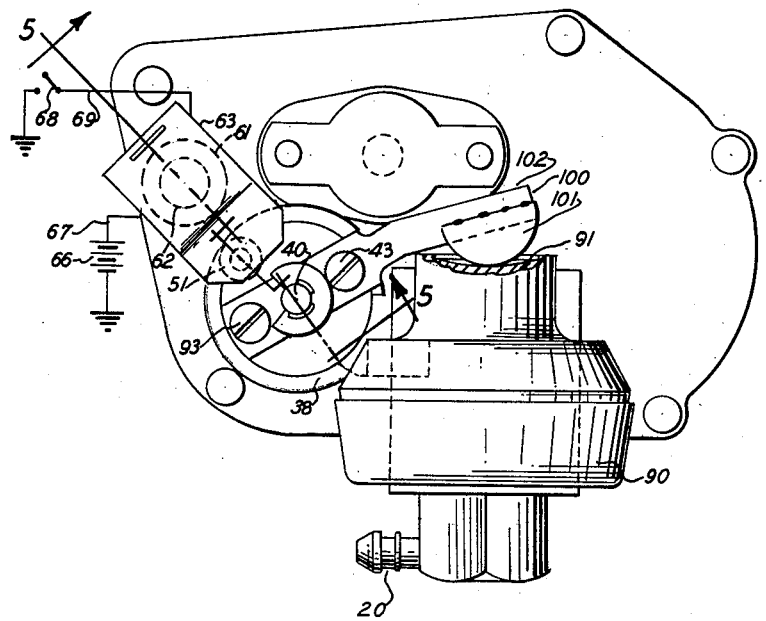
FIGURE 4 is a top view of another embodiment of the invention.
Figure 5:
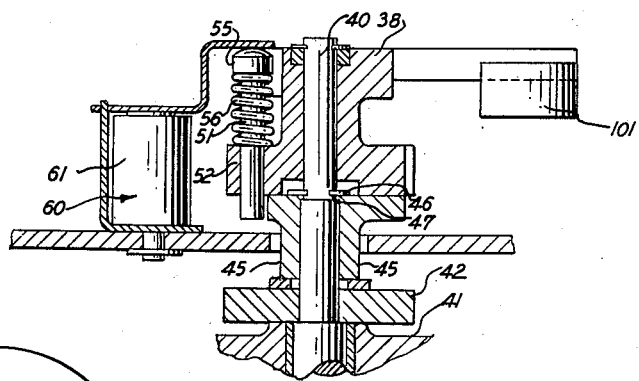
FIGURE 5 is a sectional view of the other embodiment of the invention taken along the lines 5—5 of FIGURE 4.

Another embodiment of the invention is shown in FIGURES 4 and 5. In FIGURES 4 and 5, parts which are similar to those described in conjunction with FIGURES 1–3 are designated by the same numerals. The actuating means 60, the pin 51, the driving member 45, driven member 38 and its associated structure are constructed and operate as described in connection with FIGURES 1–3. The distinctions in this embodiment lie in the pump 90 and the plunger 100 which cooperates with the pump 90 to cause fluid to be pumped through the spray nozzles 10. The pump 90 is of the type described in U.S. Patent 2,970,335 issued February 7, 1961, and U.S. Patent 2,978,727, issued on April 11, 1961, and is commonly known in the art. This type of pump has a rubber ball member or diaphragm 91 which causes fluid to be pumped through the outlet 20 when actuated by the hammer member 100. When the hammer member 100 is rotated in a counterclockwise direction, the diaphragm 91 is free to return to a normal position and, in so returning, causes washer solution to flow into the fluid chamber of the pump 90. The diaphragm 91 is returned to its normal position by its natural tendency to assume a noncompressed position. This return of the diaphragm may be aided by a spring or resilient member placed on the interior of the ball or diaphragm member. The hammer member 100 is rigidly fixed to the driving member 38 by the fastening means or screws 93. The hammer member 100 has an actuating head 101 which takes the form a half cylinder and is rigidly fixed to an arm 102.

In all of the other aspects of operation and construction, the alternative embodiment shown in FIGURE 4 and FIGURE 5 is identical with the preferred embodiment of the invention shown in FIGURES 1–3.

It should be apparent that the invention provides inexpensive and relatively simple means for automatically controlling the washing of a windshield. The method of washer operation involves little, if any, wasted washer solution. This economic utilization has the additional advantage that the reservoir need only be filled occasionally, thus partially freeing the automobile owner from a troublesome chore. It should be noted that the squirts from the windshield nozzles are synchronized with the movement of the windshield blades and a squirt can be timed so that it will receive a maximum distribution by the subsequent sweep of the wiper blade.

It will be understood that the invention is not to be limited to the exact construction shown and described and that various changes and modifications may be made without departing from the spirit and scope of the invention, as defined in the appended claims.

I claim:

1. In a windshield wiper and washer system for a windshield, a pair of wiper blades which clean said windshield, and a drive means for driving said wiper blades which is connected to said wiper blades, the combination comprising: a spray nozzle located to distribute washer solution over said windshield, a washer pump for pumping a washer solution through said spray nozzle, said washer pump having a housing and a flexible diaphragm placed in said housing to form a fluid chamber which is operatively coupled to said spray nozzle, a driven hub, a flexible band connected to said flexible diaphragm and attached to said driven hub, said driven hub adapted to wrap said flexible band about its surface to expand the chamber formed by said diaphragm and said housing when said driven hub is rotated in one direction, while said flexible band moves away from the surface of said driven hub to permit said fluid chamber to assume a normal position when said hub is rotated in the opposite direction, a driving hub for driving said driven hub, said driving hub connected to said drive means and adapted to be connected to said driven hub, a coupling means for connecting said driving hub to rotate said driven hub when operated and an actuating means for operating said coupling means.

2. The structure defined by claim 1 wherein the drive means for said wiper blades moves in an oscillating path, the driven hub has an abutment, said abutment driving said coupling means when said driving means moves in one direction while being free to move away from said coupling means when said driving means moves in the opposite direction.

3. The structure defined by claim 2 wherein said driven hub has an aperture and said coupling means is a pin which is adapted to slide through said aperture to contact said abutment of said driving hub.

4. The structure defined by claim 3 wherein said actuating means is a solenoid having an armature which is connected to said pin to actuate said pin to move through said aperture and into contact with said abutment member.

5. The structure defined by claim 4 wherein said flexible band extends into said housing to be connected to said flexible diaphragm and a resilient member surrounds said flexible band and is interposed between said housing and said flexible diaphragm.

6. In a windshield wiper and washer system having a pair of windshield wiper blades, a driving mechanism connected to said wiper blades to drive said wiper blades, a spray nozzle located adjacent the windshield, a washer pump connected to said spray nozzle to supply washer fluid to said spray nozzle, the improvement comprising:

a driving member connected to be rotated by said driving mechanism, said driving member having a surface with an abutment thereon, a driven member free to rotate independently of said driving member, said driven member having an aperture thereon, a plunger member for operating said washer pump, said plunger member directly coupled to the surface of said driven member and to said washer pump, and a coupling means for coupling said driven member to said driving member, said coupling means adapted to move in said aperture, said coupling means having an inoperative position for permitting the driving member and the driven member to rotate independently and an operative position in which said coupling means is moved in said aperture so that a portion of said coupling means will contact said abutment on said driving member, whereby said plunger member is operated by the driving mechanism of said windshield wiper system.

7. The structure defined by claim 6 wherein said member of said coupling means is a pin which slides in said aperture.

8. The structure defined by claim 7 wherein said pin is moved by a solenoid, said solenoid having an armature coupled to said pin to slide said pin and a power source for energizing said solenoid to slide said pin to an operative position and maintain said pin in said operative position when so energized.

9. The structure defined by claim 6 wherein said washer pump is a flexible ball-type pump and said plunger member is a hammer member which is located to contact said flexible ball pump.

10. In a windshield wiper and washer system for a windshield, a pair of wiper blades which clean said windshield, and a drive means for driving said wiper blades connected to said wiper blades, the combination comprising: a spray nozzle located to distribute washer solution over said windshield, a washer pump for pumping a washer solution through said spray nozzle, said washer pump having a housing and a flexible diaphragm placed in said housing to form a fluid chamber which is operatively coupled to said spray nozzle, a driven member, a flexible band coupled to said flexible diaphragm and coupled to said driven member, said driven member adapted to wrap said flexible band about its surface to expand the chamber formed by said diaphragm and said housing when said driven member is rotated in one direction, while said flexible band moves away from the surface of said driven member to permit said fluid chamber to assume a normal position when said driven member is rotated in the opposite direction, a driving member for driving said driven member, said driving member connected to said drive means and engageable with said driven member, a coupling means for engaging said driving member to rotate said driven member when operated and an actuating means for operating said coupling means.

11. In a windshield wiper and washer system for a windshield, a pair of wiper blades which clean said windshield, and a drive means for driving said wiper blades connected to said wiper blades, the combination comprising: a spray nozzle located to distribute washer solution over said windshield, a washer pump for pumping a washer solution through said spray nozzle, said washer pump having a housing and a flexible diaphragm placed in said housing to form a fluid chamber which is operatively coupled to said spray nozzle, a driven member, a flexible band coupled to said flexible diaphragm and coupled to said driven member, said driven member moving said flexible band in one direction to expand the chamber formed by said diaphragm and said housing when said driven member is rotated in one direction, while said flexible band moves in another direction to permit said fluid chamber to assume a normal position when said driven member is rotated in the opposite direction, a driving member for driving said driven member, said driving member connected to said drive means and engageable with said driven member, a coupling means for engaging said driven member to rotate said driven member when operated and an actuating means for operating said coupling means.

References Cited in the file of this patent

UNITED STATES PATENTS 2,953,802    Ziegler _____ Sept. 27, 1960